(12) United States Patent
Chess et al.

(10) Patent No.: US 8,346,911 B2
(45) Date of Patent: Jan. 1, 2013

(54) COMPUTER SYSTEM EVALUATION

(75) Inventors: David M. Chess, Mohegan Lake, NY (US); Sophia Krasikov, Katonah, NY (US); David W. Levine, New York, NY (US); John F. Morar, Mahopac, NY (US); Edward J. Pring, Yorktown Heights, NY (US); Alla Segal, Mount Kisco, NY (US); Ian N. Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 1176 days.

(21) Appl. No.: 11/378,075

(22) Filed: Mar. 17, 2006

(65) Prior Publication Data

US 2007/0220137 A1  Sep. 20, 2007

(51) Int. Cl.
*G06F 15/16* (2006.01)
*G06F 15/173* (2006.01)

(52) U.S. Cl. .......................................... 709/224; 726/25

(58) Field of Classification Search .......... 713/150–181, 713/189–194; 726/2–25, 27–30; 709/224, 709/203
See application file for complete search history.

(56) References Cited

U.S. PATENT DOCUMENTS

| | | | | |
|---|---|---|---|---|
| 7,216,160 | B2 * | 5/2007 | Chintalapati et al. | 709/224 |
| 7,360,237 | B2 * | 4/2008 | Engle et al. | 726/1 |
| 7,596,227 | B2 * | 9/2009 | Illowsky et al. | 380/277 |
| 2002/0138755 | A1 * | 9/2002 | Ko | 713/201 |
| 2005/0080898 | A1 * | 4/2005 | Block | 709/225 |

* cited by examiner

*Primary Examiner* — Jeffrey Pwu
*Assistant Examiner* — Samuel Ambaye
(74) *Attorney, Agent, or Firm* — Ido Tuchman; Stephen Kaufman

(57) ABSTRACT

A system, computer program and method for inspection of a system under inspection. The system may include an inspection program configured to access information available at the system under inspection and generate inspection data for the system under inspection. A runtime platform independent from the inspection program at the system under inspection is configured to limit the limit the contents of the inspection data to a maximum information content. A trusted third-party computer system may assist in selecting the inspection program and transferring the resulting inspection data.

14 Claims, 5 Drawing Sheets ically inspecting and evaluating remote systems (such as determining whether a computer poses a security risk). The invention evaluates systems dynamically while minimizing the amount of information those systems need to expose to other parties generally, and without requiring any a priori knowledge concerning those systems.

COMPUTER SYSTEM EVALUATION

FIELD OF THE INVENTION

The present invention relates generally to computer systems, and, more specifically, techniques for evaluating computer systems to determine the desirability of interaction.

BACKGROUND

There are many situations in which one computer needs to evaluate whether or not it is desirable to interact in a certain way with another computer. For example, a network gateway, used to control access to a computer network, may need to decide whether or not to allow a particular laptop computer to connect to the network. Similarly, a computer system containing private data concerning a given person may need to decide whether it can transmit that data to another computer system, or whether doing so would unacceptably jeopardize the privacy of the data.

In some traditional statically-configured computer systems, a human administrator configures access control policies that precisely determine which types of interaction, if any, a given computer system may engage in with specific other computer systems or groups of other systems. This configuration is based upon human knowledge or beliefs as to the nature and properties of the other computer systems. However, many computer systems are wholly or partially autonomic or self-managing. Such computer systems may not have a human administrator available at the moment in time when the decision about interaction must be made. In fact, computer systems potentially may not have a human administrator at all.

Other methods of computer system evaluation known in the art involve requiring that a computer allow itself to be inspected in various ways. For instance, network infrastructure known in the art can forbid any computer from joining the network unless it can be determined what anti-virus software that computer has installed, and that the installed software is on a list of approved anti-virus software packages. However, these methods have the disadvantage that they can only be used if a computer is willing to disclose the required information about itself to the outside world generally.

Other methods known in the art involve evaluating a system based only on information that it inherently exposes through the normal course of its operation. For example, a first computer system may determine which network ports on a second computer system are open and accepting connections. Also, a first system may determine how the second system responds to various, pre-defined queries and probes. However, these methods have the disadvantage that they are limited in their evaluations to algorithms that use already-exposed information about computer systems.

SUMMARY OF THE INVENTION

The present invention addresses the above-mentioned limitations of the prior art by introducing techniques for dynamically inspecting and evaluating remote systems (such as determining whether a computer poses a security risk). The invention evaluates systems dynamically while minimizing the amount of information those systems need to expose to other parties generally, and without requiring any a priori knowledge concerning those systems.

Thus, one exemplary aspect of the present invention is a method for inspection of a first computer system. The method includes a receiving operation configured to receive a computer executable inspection program at the first computer system. Furthermore, the inspection program is configured to inspect accessible data at the first computer system. A sending operation sends inspection data generated by the inspection program from the first computer system. A providing operation provides a runtime platform at the first computer system for execution of the inspection program. The runtime platform is independent from the inspection program and configured to limit the contents of the inspection data to a maximum information content.

Another exemplary aspect of the invention is an inspection system for inspecting a first computer system by a second computer system. The inspection system includes a computer network and a third computer system coupled to the network. The third computer system is configured to receive at least one inspection program from the second computer system, send the inspection program to the first computer system, and receive inspection data generated by the inspection program.

Yet another exemplary aspect of the invention is a computer program product. The computer program product includes computer executable instructions configured for: receiving a computer executable inspection program at a system under inspection; sending inspection data generated by the inspection program from the system under inspection; and executing the inspection program in a runtime platform. As mentioned above, the runtime platform is independent from the inspection program and is configured to limit the contents of the inspection data to a maximum information content.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
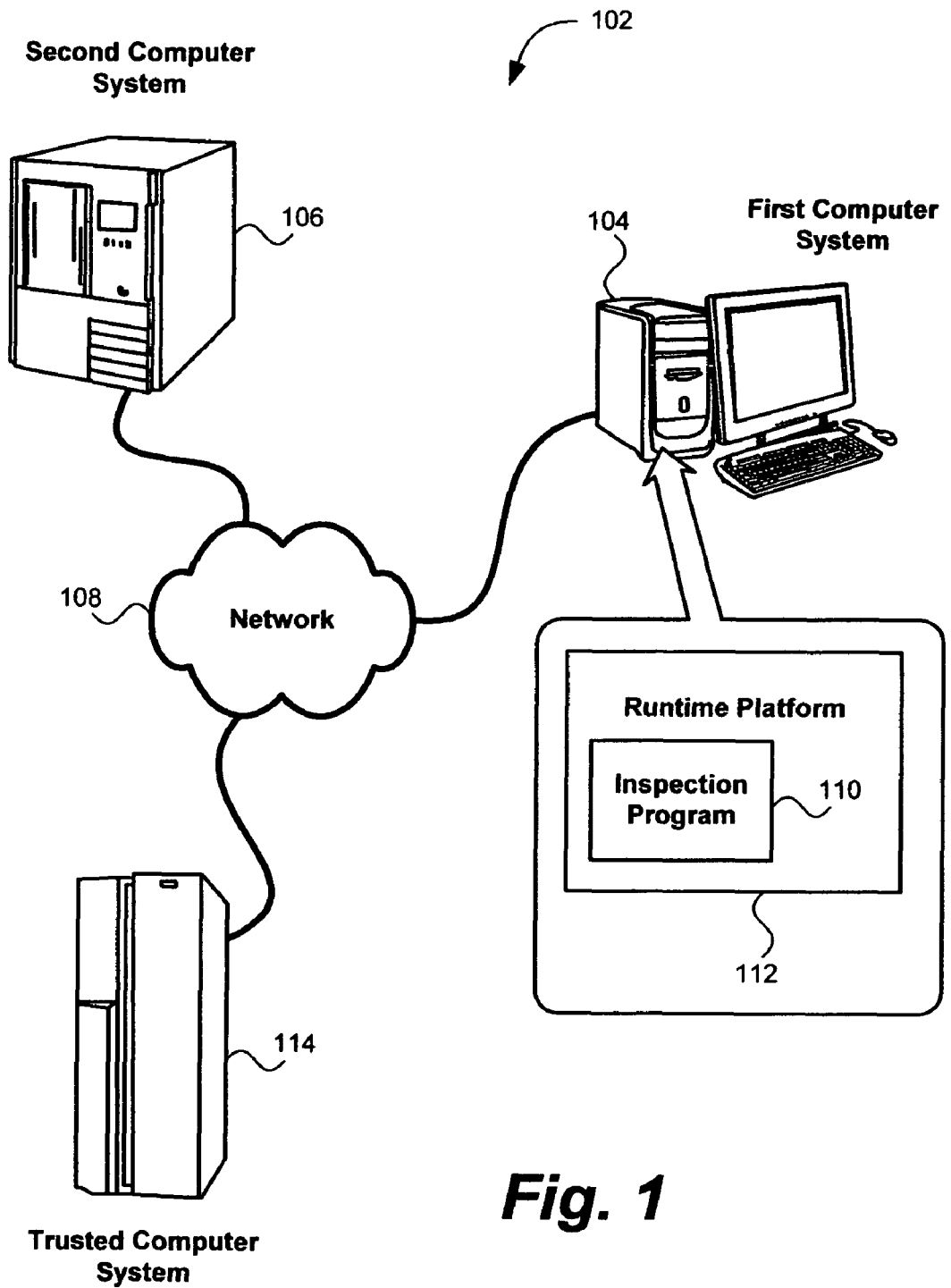
FIG. 1 shows an exemplary environment demonstrating an embodiment of the present invention.

The following description details how the present invention is employed to evaluate systems to determine the desirability of interaction. Throughout the description of the invention reference is made to FIGS. 1-5. When referring to the figures, like structures and elements shown throughout are indicated with like reference numerals.

FIG. 1 shows an exemplary environment 102 demonstrating an embodiment of the present invention. In this environment 102, a first computer system 104 is connected to a second computer system 106 via a computer network 108. As used herein, the term "computer system" means one or more general-purpose and/or specific-purpose computers. Thus, computer systems may include, without limitation, host computers, client computers, peripherals, machines, telecommunications devices (e.g., modems and routers), composite systems composed from multiple other systems, and computer software and software subsystems running therein.

Assume the first computer system 104 wishes to access the second computer system 106, and the second computer system 106 wishes to inspect the first system 104 and to evaluate the desirability of interacting with the first system 104. For example, the second computer system 106 may want to inspect whether or not the first computer 104 posses a security risk (e.g., contains computer viruses, has authorization to access sensitive information, etc.). It is noted, however, that the present invention is not limited to security evaluation. It is contemplated that the evaluation may confirm, for example, that the first computer system 104 conforms to applicable policies and regulations, offers an acceptable standard of privacy, is configured in a manner intended, possesses sufficient computing power to accomplish the intended usage, is sufficiently reliable, is generally compatible with the second computer system 106, or any combination thereof.

To remotely inspect the first computer system 104, the second computer system 106 sends an inspection program 110 to the first computer system 104 via the network 108. The first computer system 104 executes the inspection program 110 in a runtime platform 112. As used herein, a "runtime platform" is defined as a computer environment in which inspection programs are executed. The runtime platform 112 is independent from the inspection program and may include an operating system for execution of compiled inspection programs, or an interpreter for execution of interpreted inspection programs. In one embodiment of the invention, the runtime platform is a virtual machine, such as a Java Virtual Machine (JVM) executing on the computer under inspection. The inspection program 110 is configured to inspect data accessible to it and report back its findings back to the second computer system 106. For instance, the inspection program 110 may analyze the first computer's registry and/or file tree in search of evidence of malicious programs installed at the first computer system 104. After receiving inspection data from the inspection program 110, the second computer system 106 can make a determination whether to allow access to the first computer system 104.

In one embodiment of the invention, the runtime platform 112 allows the inspection program 110 to access all information normally available to other applications running in at the first computer system 104. Thus, the inspection program 110 may analyze features of the first computer system 104 which are not externally exposed via the network 108. Nevertheless, the runtime platform 112 protects the first computer system 104 from overly intrusive inspection programs by limiting the contents of inspection data sent by the inspection program 110 back to the second computer system 106. For example, the runtime platform 112 may allow the inspection program 110 unfettered access to accessible data at the first computer system 104, but only allow the inspection program 110 to transmit a single bit payload to the second computer system 106 indicating pass or fail of the inspection.

Thus, the present invention can beneficially achieve a desirable balance between openness and caution in evaluating whether remote computer systems should interact. The runtime platform 112 provides the inspection program 110 with broad access to information at the computer system under inspection, but limits the inspection results transmitted by the inspection program 110. In other words, techniques of the present invention advantageously provide dynamic evaluation of previously unknown partners, while minimizing the risks of sensitive information exposure. Although the potential interaction partner 104 allows a system 106 to transmit an inspection program 110 for execution, its runtime platform 112 can strictly limit the amount of information the inspection program 110 can return back to the transmitting system 106. Those skilled in the art will therefore appreciate that configurations of the present invention can help prevent malicious inspection programs from extracting large amounts of information from the system under inspection.

In a particular embodiment of the invention, the environment 102 includes a trusted third-party system 114 coupled to the network 108. As discussed in more detail below, the third-party system 114 may, for example, belong to an entity specializing in computer security and be trusted by both the first computer system 104 and the second computer system 106. It is contemplated that the third-party system 114, under instructions from the second computer system 106, issues the inspection program 110 to the first computer system 104. Furthermore, the runtime platform 112 at the first computer system 104 may limit communication of the inspection results to only the third-party system 114. Such a configuration adds an additional level of assurance that a received inspection programs will not cause harm to the system under inspection or expose sensitive data to an unfamiliar party.

In one embodiment of the present invention, the third-party system 114 may be embodied as or linked to a real-world entity such as a certification authority or a bonding agency. The third-party system 114 may fulfill any of various roles, including without limitation negotiation, certification and bonding. The third-party system may be embodied as a server in an inspection system, providing various inspection services discussed herein. The specific roles played by the third-party system 114 in each such embodiment are discussed in further detail below.

The network 108 may be any of various types of networks known in the art, including wired and/or wireless networks. The network 108 may employ various configurations known in the art, including by example and without limitation TCP/IP, Wi-Fi®, Bluetooth® piconets, token ring, optical and microwave. Wi-Fi is a registered trademark of the Wi-Fi Alliance, located in Austin, Tex. Bluetooth is a registered trademark of Bluetooth SIG, Inc., located in Bellevue, Wash. It is noted that the present invention does not require the existence of a network. For example, the second computer system 106 may be connected to the first computer system 104 via a direct physical connection, including by example and without limitation via Universal Serial Bus, parallel port or serial port.

It is contemplated that one exemplary environment embodying the present invention is a client-server system, with the first computer system 104 configured as the client and the second computer system 106 configured as the server. It is further contemplated that in another environment embodying the present invention, the second computer system 106 may be the gateway for a network to which the first computer system 104 wishes to connect. It is emphasized, however, that the present invention does not require either of these relationships. More generally, the present invention does not require a hierarchical relationship between the first and second computer systems 104, 106. Additionally, an exemplary environment embodying the present invention may include more than two systems. Moreover, each system in the exemplary environment 102 may potentially act as the first computer system 104, the second computer system 106, both or neither at any given time.

In an embodiment of the present invention, two systems may bilaterally evaluate each other to determine the suitability of further interaction. It is contemplated that bilateral evaluation in this fashion may be used to confirm the mutual compatibility of two systems. In this embodiment, each system sends an inspection program to the other system. Thus, each system simultaneously acts as the second computer system 106 with respect to the inspection program it sends and as the first computer system 104 with respect to the inspection program it receives. The two inspection programs sent may be different from each other. In a further embodiment of the present invention, each system independently determines whether it wishes to interact further with the other system. In another further embodiment of the present invention, the results of both inspection programs are combined, and the combined results are used to determine whether the two systems should continue to interact with each other. It is noted that these configurations can be extended to an arbitrary number of systems by repeating the bilateral evaluation for each combination of two systems which can be formed from the overall group. For example, to confirm the mutual desirability of interaction of three systems, "A", "B", and "C", it would suffice to bilaterally evaluate "A" and "B", "A" and "C", and "B" and "C".

Figure 2:
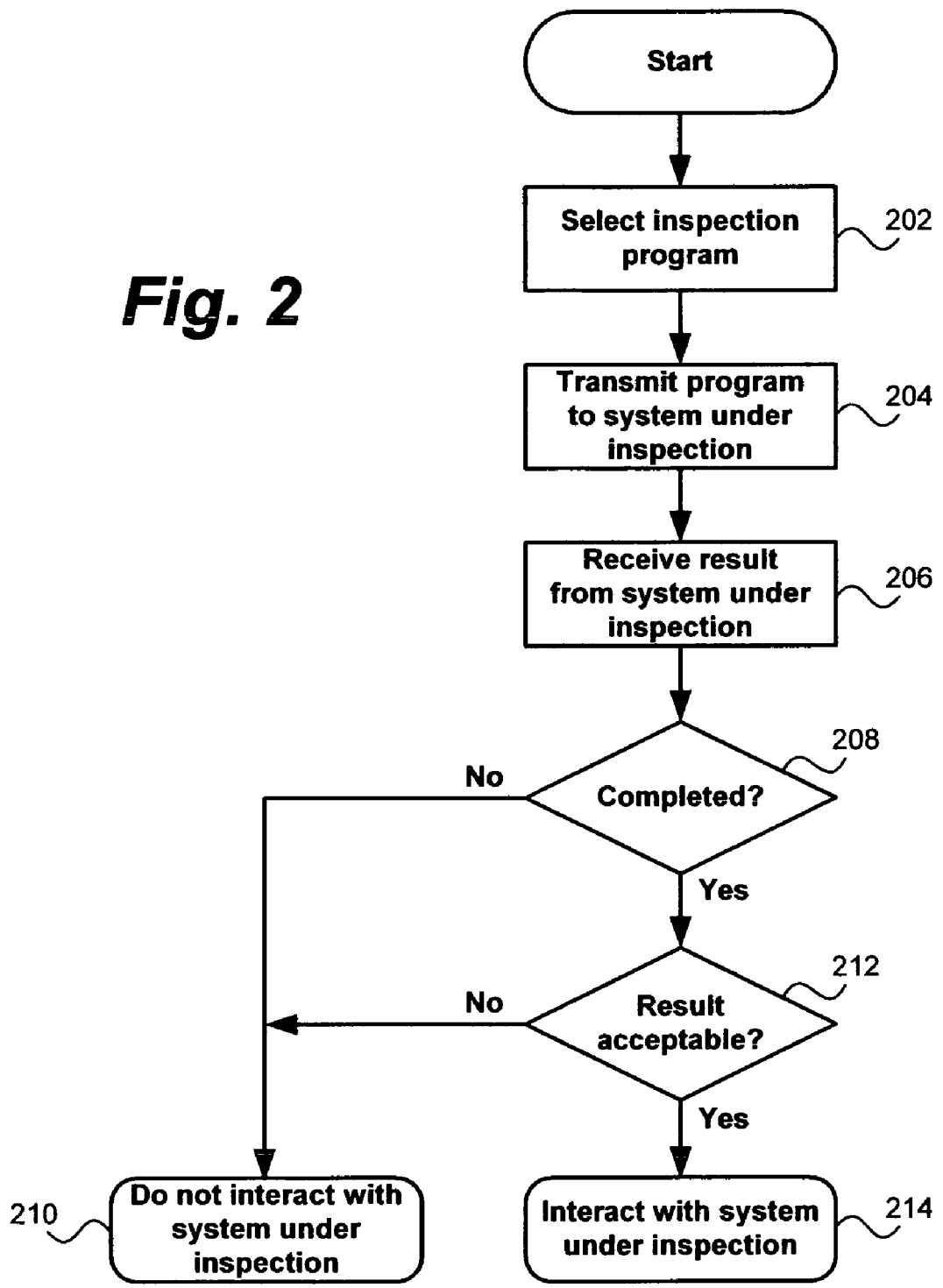
FIG. 2 shows an exemplary flowchart of operations performed by an inspecting system, as contemplated by the present invention.

Turning now to FIG. 2, an exemplary flowchart of operations performed by an inspecting system (e.g., second computer system 106 in FIG. 1) is shown. It should be remarked that the logical operations shown may be implemented (1) as a sequence of computer executed steps running on a computing system and/or (2) as interconnected machine modules within the computing system. Furthermore, the operations may be performed on a virtual machine abstracted in a computer platform, such as the Java Virtual Machine (JVM) executing over a native operating system. The implementation is a matter of choice dependent on the performance requirements of the system implementing the invention. Accordingly, the logical operations making up the embodiments of the present invention described herein are referred to alternatively as operations, steps, or modules.

In selecting operation 202, the inspecting system selects an appropriate inspection program to evaluate the system under inspection (e.g., first computer system 104 in FIG. 1). It is contemplated that many exemplary environments embodying the present invention will be heterogeneous. In such environments, the system under inspection may be any of several types of systems. For example, on a heterogeneous network, the system under inspection may be based on either the Windows® operating system or the Linux operating system. Windows is a registered trademark of Microsoft Corporation, located in Redmond, Wash. Thus, the inspecting system selects the inspection program based on the type of system under inspection.

In one embodiment of the present invention, the system under inspection may declare specifications that inspection programs must meet to be accepted for execution. For example, the system under inspection may accept interpreted Java bytecodes but not compiled C code. The inspecting system may select one particular inspection program from a plurality of available inspection programs that conforms to the specifications of the system under inspection. It is contemplated that the inspecting system may refuse interaction with the system under inspection in the event that no available inspection program conforms to the specifications.

In a further embodiment of the present invention, the system under inspection declares its specifications for acceptable inspection programs using standard forms of representing programming languages and interfaces. In a particular embodiment, the system under inspection provides an application programming interface (API) to allow discovery and querying of its specifications. In another embodiment of the invention, the system under inspection provides protocols to communicate its specifications. In yet another further embodiment of the invention, the inspecting system and system under inspection negotiate to determine an inspection program acceptable to both systems. This negotiation may utilize APIs and protocols as previously discussed, may utilize a programming language, or may utilize various other methods known to those skilled in the art. This negotiation may be facilitated by one or more trusted third parties. For example, a trusted third party may communicate the specifications of the system under inspection on its behalf.

In transmitting operation 204, the inspecting system transmits the selected inspection program via the network to the second system. The inspection program is processed and executed by the system under inspection, as described in detail below. After the inspection program is executed at the system under inspection, control passes to receiving operation 206.

At receiving operation 206, the inspecting system receives the inspection results from the execution of the inspection program on the system under inspection via the network. It is noted that the system under inspection may fail to return inspection results for any number of reasons, including without limitation refusal to run the inspection program due to non-conformity to specifications, inability to run the inspection program due to technical limitations, failure or substantial lag in the network, or even a system crash. A failure indication may be transmitted to the inspecting system to communicate that the inspection program was not completely and successfully executed. In an embodiment of the present invention, the inspecting system waits for a defined maximum amount of time for inspection results. If this time limit is reached or exceeded, processing continues with determining operation 208 even if no inspection output has been received.

At determining operation 208, the inspecting system determines whether inspection results were returned by the system under inspection. If results were not returned, control passes to blocking operation 210, at which the inspecting system refuses to interact with the system under inspection. It is contemplated that blocking operation 210 may include communication of the refusal to the system under inspection, as well as any internal bookkeeping measures required to denote the fact that the system under inspection is not authorized to interact with the inspecting system.

If, at determining operation 208, inspection results were indeed returned, processing continues to determining operation 212. At determining operation 212, the inspecting system analyzes the output of the inspection program to determine the desirability of interaction with the system under inspection. It is noted that this step is only reached if inspection results were received by the inspecting system. If the analysis shows that further interaction is undesirable, control passes to blocking operation 210 as discussed above. If the analysis shows that further interaction is indeed desirable, processing continues with accepting operation 214.

At accepting operation 214, the inspecting system accepts further interaction with the system under inspection. It is contemplated that accepting operation 214 may include communication of the acceptance to the system under inspection, as well as any internal bookkeeping measures required to denote the fact that the system under inspection is authorized to interact with the inspecting system.

Embodiments of the present invention permit inspection programs to incorporate several different approaches to determine the suitability of further interaction. One approach is for the inspection program to inspect the system under inspection, to perform its own analysis while still executing on the system under inspection, and to return a single bit to the inspecting system. The binary value of the bit communicates whether or not it is desirable to interact further with the system under inspection. This approach is possible even if the system under inspection limits the quantity of output returned by the program to a single bit.

An alternate approach is for the inspection program to return more detailed information to the inspecting system, subject to the limits imposed by the system under inspection. The inspecting system would then apply algorithms to the data returned, making its own determination as to whether interaction is desirable. It is noted that a hybrid of the two approaches is possible. The inspection program may partially analyze the data and perform reducing operations while executing on the system under inspection, with the inspecting system analyzing the reduced data and making a decision such as blocking communications or accepting communications based on the results. It is emphasized that the possible approaches to determining the desirability of further interaction are not limited to those discussed here. The present invention allows a wide range of possible inspection programs, specifications for inspection programs imposed by the system under inspection, and decision-making criteria by the inspecting system.

It is also noted that the present invention does not restrict the inspecting system to a binary choice between absolute acceptance and absolute refusal of interaction. Degrees of trust based on the information returned for the program are also possible, such as conditionally accepting communications or accepting communications with restrictions. For example, the inspecting system could decide it trusts the system under inspection sufficiently to allow File Transfer Protocol (FTP) connections, but not sufficiently to allow more powerful and therefore higher-risk Secure SHell (SSH) connections.

Figure 3:
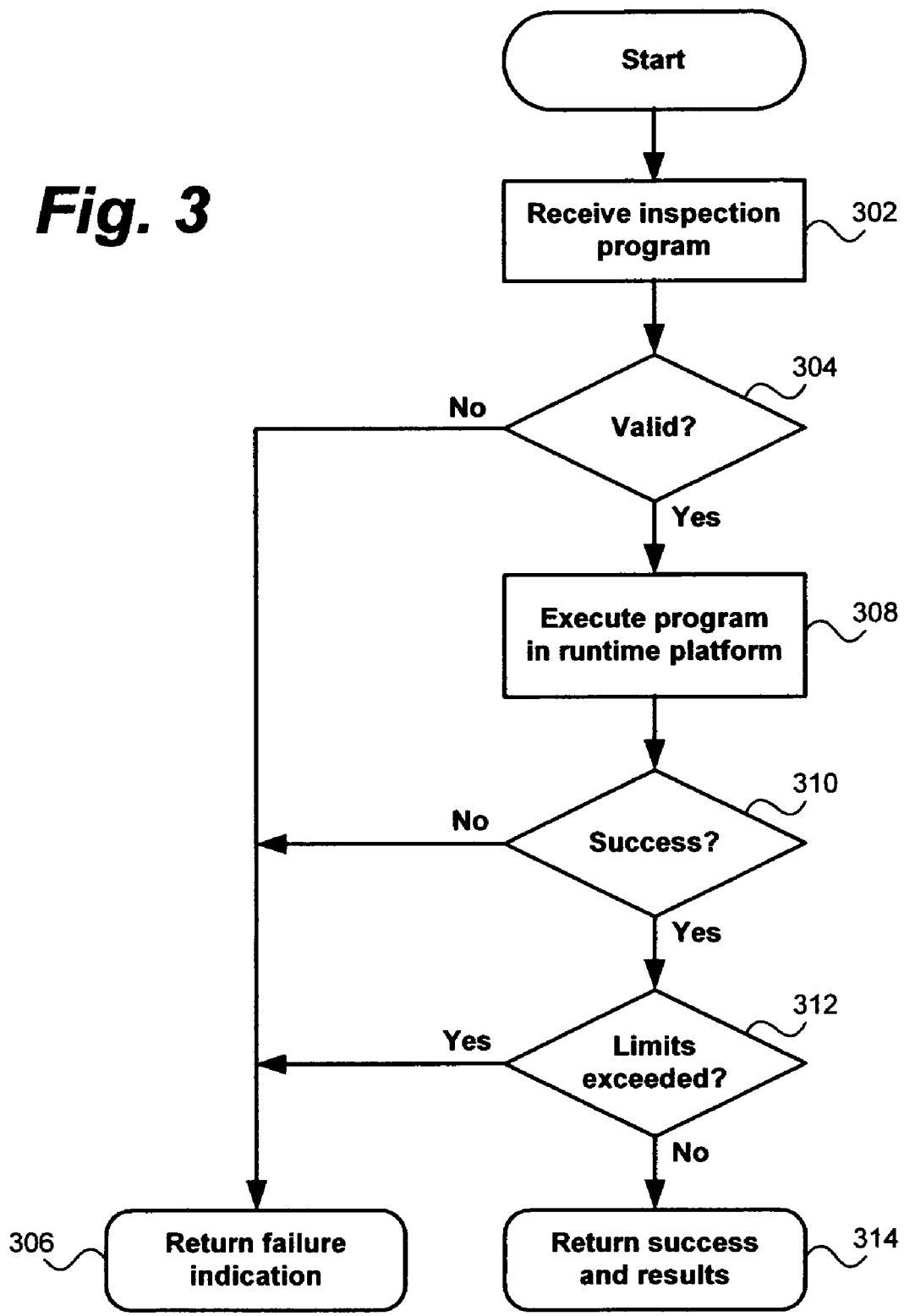
FIG. 3 shows an exemplary flowchart of operations performed by a system under inspection, as contemplated by the present invention.

Continuing to FIG. 3, an exemplary flowchart of operations performed by the system under inspection is shown. Typically operations shown in this flowchart commence after transmitting operation 204 shown in FIG. 2.

At receiving operation 302, the system under inspection receives an inspection program from the inspecting system via the network. After receiving operation 302 is completed, control passes to determining operation 304.

At determining operation 304, the system under inspection analyzes the inspection program to ensure it is acceptable for execution. This analysis may be based on specifications announced by the system under inspection or as announced by a trusted third party (as discussed above). If the inspection program is rejected, control passes to rejecting operation 306, at which a failure indication is returned to the inspecting system via the network. In an embodiment of the invention, the failure indication is communicated as an exception. An exception is a programming construct known in the art which communicates an unusual or undesirable situation and provides information relating to that situation. Typically, processing continues after rejecting operation 306 at the inspecting system's receiving operation 206 (shown in FIG. 2).

If the inspection program is accepted by the system under inspection, processing continues to executing operation 308. Executing operation 308 executes the inspection program in a runtime platform. The runtime platform may place limits on the behavior of the inspection program. One such limit is a maximum information content of output data that the inspection program may return to the inspecting system. This limit may be a security measure intended to reduce the risk that the inspection program will return sensitive data to the inspecting system. In one embodiment of the invention, the inspection program is restricted to return a quantity of result data that is less than the quantity of accessible data. The runtime platform may also place limits on the quantity of system resources the inspection program may utilize and/or the system functionality the inspection program may access. It is contemplated that the runtime platform may limit or otherwise restrict specific aspects of inspection program behavior without departing from the spirit and scope of present invention.

At determining operation 310, the system under inspection determines whether the inspection program successfully executed. In the event that the program failed, control passes to rejecting operation 306, which advises the inspection system that the inspection program did not execute successfully. If the inspection program executed successfully, processing continues to determining operation 312.

At determining operation 312, the system under inspection determines whether the inspection program violated or attempted to violate one or more of the limits imposed by the runtime platform. If so, control passes to rejecting operation 306. In particular, the failure indication (as per rejecting operation 306) is returned to the inspecting system if the inspection program successfully completed execution but attempted to return a higher quantity of data than is allowed. In an embodiment of the invention, only the failure indication is returned and no output is returned. In another embodiment of the invention, the inspection program result data is returned but is truncated so as to conform to the size limit, and a failure indication is also returned to communicate the fact that the output was truncated. It is contemplated that the truncated form of the output need not start at the beginning of the attempted output, nor must it be consecutive, nor must it reduce the output to the exact quantity specified by the limit.

Furthermore, if the program was unable to conform to any other limit imposed by the runtime platform, control likewise passes to rejecting operation 306. Inability to conform to such a limit may cause complete failure of the inspection program. For example, if a limit on total processor time was imposed but exceeded, the inspection program may have already been forcibly stopped by the runtime platform. In this case, the determining operation 310 may have already invoked rejecting operation 306 in response to the inspection program's failure. If no limits were exceeded, processing continues to sending operation 314.

At sending operation 314, the system under inspection returns the acceptable inspection results to the inspecting system via the network. Typically, processing continues after sending operation 314 at the inspecting system's receiving operation 206 (shown in FIG. 2).

Figure 4:
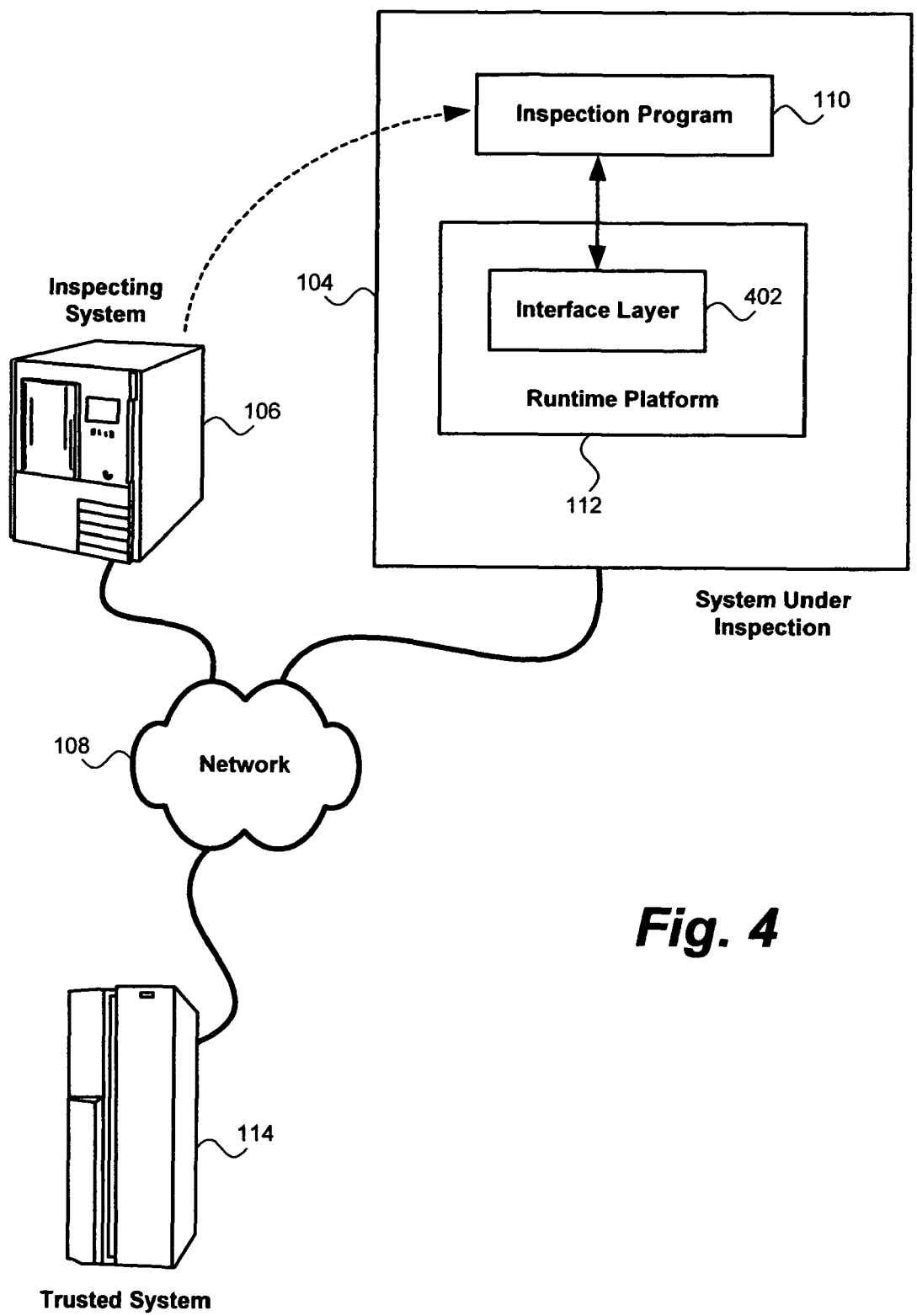
FIG. 4 shows another exemplary environment of the present invention.

With reference now to FIG. 4, an exemplary configuration of a system under inspection 104 embodying the present invention is shown. It is emphasized that the configuration shown in this figure is only one of many possible configurations of a system under inspection embodying the present invention. Moreover, the present invention may be implemented in hardware, software stored in read only memory, software stored in random access memory, or any other storage mechanism.

As shown, an interface layer 402 is coupled to an inspection program 110 at the system under inspection 104. The interface layer 402 is a subsystem of the system under inspection 104, and acts as an intermediary between the inspecting system 106 and the system under inspection 104. The interface layer 402 receives acceptable inspection programs to be executed within a runtime platform 112. Additionally, the interface layer 402 returns acceptable inspection results generated by inspection programs 110 in the runtime platform 112 to the inspecting system 106.

To allow for a wide variety of systems and purposes, the present invention may permit inspection programs 110 to be in any language, format or the like. As mentioned above, inspection programs 110 may be interpreted, compiled or a combination of both methodologies. The inspection program 110 may be written in a variety of programming languages known in the art, including without limitation Java, C, C++, assembly language and Extensible Markup Language (XML).

An inspection program 110 sent by the inspecting system 106 via the network 108 is received by the system under inspection 104 at the interface layer 402. The interface layer 402 first evaluates the inspection program 110 for acceptability as discussed above. It is noted that the inspection program 110 may be evaluated even in the absence of any published specifications. Moreover, even if specifications are published, criteria not included in those specifications may be applied in evaluating the inspection program 110.

Various techniques may be used to evaluate the inspection program 110. The interface layer 402 may note the language in which the inspection program 110 is written and may apply guidelines about whether that language is accepted. The interface layer 402 may note the runtime libraries utilized by the program 110 and/or the specific functions in each library called by the inspection program 110 and may apply guidelines about whether each library and/or function call is permissible. It is contemplated that any libraries and/or function calls allowing access to the network 108 will generally be blocked, as such functions may permit a rogue or malicious inspection program 110 to evade the limits on the inspection results returned to the inspecting system 106. In an embodiment of the present invention, inspection programs 110 utilizing disallowed libraries or invoking disallowed functions are rejected entirely. It is contemplated that this may result in a negotiation process to determine a mutually acceptable program 110. The negotiation process may consist of the inspecting system 106 sending one or more alternate inspection programs 110, any of which are acceptable to itself, in an attempt to determine an inspection program 110 that the system under inspection 104 finds acceptable.

In another embodiment of the present invention, inspection programs 110 invoking disallowed function calls are accepted, but the function calls themselves are disallowed and the program 110 is responsible for gracefully handling the failed function call. In this embodiment, the runtime platform 112 may be responsible for blocking disallowed function calls. Furthermore, the interface layer 402 may even analyze the inspection program's logic. This may occur whether the program 110 is sent as source code (e.g., Extensible Markup Language (XML)), in a tokenized form which is interpreted (e.g., Java bytecodes), or even as machine language code (e.g., compiled C programs for a specific computer architecture.) It is emphasized that the techniques to evaluate the inspection program 110 are not limited to those discussed here, and the present invention may utilize additional or alternative techniques known to those skilled in the art.

In an embodiment of the present invention, the interface layer 402 may forward the inspection program 110 to a trusted third party 114 which specializes in computer security. The trusted third party 114 would then analyze the inspection program 110 and make a determination as to whether the program 110 is safe for execution on the system under inspection 104. The trusted third party 114 may also utilize methods to verify the identity of the inspecting system 106 which sent the inspection program.

Inspection programs 110 deemed acceptable are executed within the runtime platform 112. The interface layer 402 may invoke and/or initialize the inspection program 110 within the runtime platform 112. Where the system under inspection 104 allows inspection programs 110 to be in any of multiple programming languages or environments, multiple and separate runtime platforms 112 may exist, and the choice of which runtime platform 112 to use depends on the type of inspection program 110 being executed.

The runtime platform 112 may allow the inspection program 110 less than complete control over the system under inspection 104. Such an environment is also known in the art as a "sandbox." It is contemplated that controlling the actions of the inspection program 110 can be especially critical when the inspection program 110 is compiled. In fact, it is contemplated that the restrictions may be sufficiently stringent as to constitute a virtual, or even an essentially interpreted, runtime environment.

The runtime platform 112 may impose limits on the resource usage and behavior of the inspection program 110. The runtime platform 112, for example, may limit the total amount of processing time, possibly measured in terms of central processing unit (CPU) cycles, used by the program. The runtime platform 112 may limit the proportion of processing time used by the inspection program 110 compared to actual clock time. Such a limit may ensure the inspection program 110 does not interfere with other functions of the system under inspection 104. The runtime platform 112 may limit the total clock time used by the program 110. Such a limit may ensure the inspection program 110 does not cause a denial of services, enter an infinite loop, deadlock or other situation in which the program 110 is not using excessive processing power but is nonetheless failing to complete its supposed task. Moreover, limits may be placed on resources other than time. The runtime platform 112 may limit the amount of random access memory, virtual memory, disk space or any other form of storage which the inspection program 110 may utilize. It may also restrict the areas of persistent and/or non-persistent storage which the program 110 may access. It is emphasized that the limits and restrictions which may be placed on the program 110 are not confined to those discussed here.

While executing in the runtime platform 112, the inspection program 110 may analyze various facets of the system under investigation 104. It is emphasized that any such analysis is subject to limitations placed on the inspection program 110 as discussed above. The inspection program 110 may analyze the hardware configuration of the system under investigation 104. The inspection program 110 may analyze the identity and/or details of computer program products which are installed and/or currently executing. It may analyze the settings of any programs on the system under investigation 104. This may include inspecting operating system features designed to maintain lists of program settings, including without limitation the Registry feature of the Windows operating system and the java.util.Properties application programming interface (API) of the Java environment. The inspection program 110 may confirm the presence and adequacy of subsystems of the system under investigation 104 which guard against harmful computer code such as viruses, worms and Trojan horses. The inspection program 110 may confirm the presence and adequacy of subsystems known in the art as "firewalls" which monitor the network 106 in order to guard the system under investigation 104 against external threats. The inspection program 110 may analyze data in persistent and/or non-persistent storage, although it is contemplated that the system under investigation 104 may place limits on such activity.

Increased system access beneficially assists the inspection program 110 in analyzing the system under investigation 104. Nonetheless, the system under investigation 104 may strictly limit the behavior of the program, including, without limitation, the data that the program may access. The inspection program 110 returns output (inspection results) from its analysis to the inspecting system 106. However, the system under investigation 104 can generally place limits on the quantity of output which the program may return. The inspecting system 106 uses the program's output to determine whether to interact with the system under investigation 104, and if so, on what terms. One advantage of such a configuration is that it allows the system under investigation 104 to be dynamically evaluated while minimizing the amount of information the system under investigation 104 needs to expose generally to outside parties.

The interface layer 402 receives any output generated by the inspection program 110 within the runtime platform 112. In an embodiment of the present invention, the output is passed to the interface layer 402 only upon termination of the inspection program 110. In another embodiment of the present invention, the output is passed to the interface layer 402 dynamically as it is generated.

The interface layer 402 may limit the maximum quantity of output returned to the investigating system 106. This limit can be a security measure intended to reduce the risk that the inspection program 110 will return sensitive data to the investigating system 106. In an embodiment of the present invention, the maximum quantity is measured in bits, or binary digits. It is noted that measuring the limit in terms of the word size of a given computer architecture is functionally equivalent to measuring the limit in terms of bits, because the word size is itself a defined, constant number of bits. The limit may be as small as a single bit. Even in this extreme case, the limit is sufficient to allow communication of a simple True or False answer as to whether further interaction is desirable. It is noted that imposing a limit on the quantity of output may be optional. In an embodiment of the present invention, the quantity of output is not compared to a limit until after the inspection program 110 has terminated. In another embodiment of the present invention, once the limit on the quantity of output has been reached, the program is terminated by the runtime platform 112.

In an embodiment of the present invention, the limit on the maximum quantity of output may vary depending on the actual behavior of the inspection program 110. In a further embodiment of the present invention, the limit may be dynamically reduced as more information is accessed by the inspection program 110. For example, an exemplary system under investigation 104 may normally impose a limit of one kilobyte (KB) to allow substantial configuration information to be returned verbatim to the investigating system 106. However, if over one megabyte (MB) of data is accessed, the system under investigation 104 may reduce the limit to one bit, a quantity sufficiently small to thwart any attempt to scan for certain sensitive data and return the data verbatim. In another further embodiment of the present invention, the limit may be dynamically reduced if more sensitive information is accessed. For example, a program may be able to access defined lists of settings without penalty, but may have its limit reduced to 32 bits if it accesses a file system in order to prevent the inspection program 110 from returning data located on that file system verbatim.

In the present invention as discussed thus far, there is a theoretical risk that a harmful investigating system 106 will send multiple inspection programs 110, each returning a small portion of the data desired, in order to evade the limit on the quantity of output returned. It is contemplated that this risk is unlikely in practice given proper usage of the limiting operations already discussed. Nonetheless, in an embodiment of the present invention, the interface layer 402 may impose a maximum cumulative limit on the quantity of output sent to the same investigating system 106 in a defined period of time. The quantity of output generated by all inspection programs 110 originating from the investigating system 106 during this time period is summed. If the limit has been reached or exceeded, output is not sent to the investigating system 106. In another embodiment of the present invention, the interface layer 402 may impose a maximum cumulative limit on the quantity of output sent to any system in a defined period of time. The quantity of output generated by all inspection programs 110, regardless of the system from which they originate or appear to originate, is combined and summed. If the limit has been reached or exceeded, output is not sent to any system. It is noted that in either embodiment, the passage of time will generally cause output previously sent to cease to count towards the limit, thus automatically re-enabling output after a waiting period.

The investigating system 106 may need to periodically re-evaluate the desirability of interacting with the system under investigation 104. After all, most systems change over time. It follows that any such change may affect the desirability of interaction. Thus, in an embodiment of the present invention, the initial transmission of a program may include a requested schedule at which the inspection program 110 should be executed. The system under investigation 104 may follow the requested schedule, repeating the execution of the inspection program 110 according to the schedule and returning the output of each run to the investigating system 106. In another embodiment of the present invention, a negotiation process is provided by which the two systems determine a mutually acceptable schedule at which the program is to be executed.

The system under investigation 104 may desire assurance that it will not be harmed by the program transmitted by the investigating system 106. Thus, in an embodiment of the present invention, a bond is provided to the system under investigation 104 and/or the legal persons or entities owning, managing or otherwise associated with it. The bond will provide compensation, monetarily and/or otherwise, in the event that the program causes harm. Harm may include without limitation damage to the system under investigation 104 itself, interruption of its services and deletion, corruption or disclosure of data housed therein. In a further embodiment of the present invention, the bond is provided by the investigating system 106 and/or one or more of the legal persons or entities owning, managing or otherwise associated with it. In another further embodiment of the present invention, the bond is provided by a trusted third party 114. It is contemplated that the trusted third party 114 may require access to the inspection program 110 before it is executed in order to decide whether to issue the bond and, if issued, the size of the bond and/or the terms under which it is issued.

When specific functionality is disallowed by the system under investigation 104, alternate functionality permitted by the system under investigation 104 may exist to accomplish a similar end. Thus, in an embodiment of the present invention, a program which is unacceptable to the system under investigation 104 may be transformed into another program which is functionally similar, but which meets the requirements of the system under investigation 104. In a further embodiment of the present invention, the system under investigation 104 performs its own transforming operations on the inspection program 110. In another further embodiment of the present invention, the transforming operations are performed by a trusted third party 114. Each of these embodiments may allow for a copy of the transformed version of the program to be returned to the investigating system 106. It is contemplated that the investigating system 106 may account for the fact that the program was transformed, and may even analyze the transformed program, in deciding whether to interact further with the system under investigation 104.

Most facets of the inspecting system 106 have already been discussed, however, a few additional details are useful to further elaborate on the operation of the inspecting system 106. The inspecting system 106 may wish to ensure that the output of the inspection program 110 has not been tampered with by the system under investigation 104. It is possible for seemingly valid output to be erroneous because it does not reflect the actual state of the system under investigation 104. For example, when the desirability of interaction is communicated via a single bit, a system under investigation 104 might fraudulently return a bit set to True in lieu of actually executing the program. Thus, in an embodiment of the present invention, a digital signature is included in the output before it is transmitted to the inspecting system 106. The digital signature may utilize cryptographic techniques, including without limitation public key encryption. In another embodiment of the present invention, the inspection program 110 may incorporate encrypted functions. The usage of encrypted functions may render it computationally infeasible for the system under investigation 104 to tamper with or even meaningfully analyze the behavior of the program even though the program is executing under the direct control of the system under investigation 104. In another embodiment of the present invention, a trusted third party 108 may verify that the inspection program 110 is executed in an environment which allows it access to the data it requires. The trusted third party 108 may also ensure that the system under investigation 104 does not tamper with the execution of the program and/or the program's output.

In an embodiment of the present invention, the inspecting system 106 may challenge the authenticity of the output of the inspection program 110. Such a challenge is a request for additional evidence and/or verification that the output returned to the inspecting system 106 was actually generated by execution of the inspection program 110 on the system under investigation 104. In a further embodiment of the present invention, the system under investigation 104 responds to the challenge by releasing additional information as evidence that the output validly reflects the results of proper execution of the inspection program 110. In another further embodiment of the present invention, a trusted third party 114 judges any such evidence and makes a finding as to the validity of the output. It is contemplated that in either case, the information required as evidence of the validity of the output may be private data of the system under investigation 104 which would not normally be exposed even in the context of the present invention. Thus, in a further embodiment of the present invention, when a challenge results in evidence that the program output was in fact authentic, the inspecting system 106 or the entities associated with it may be required to pay an incentive to the system under investigation 104 or the entities associated with it. This incentive may consist of money and/or other goods. The purpose of requiring an incentive may be to protect the privacy of data on the system under investigation 104 by discouraging challenges except when the inspecting system 106 has a concrete, objective reason to suspect false output. In another further embodiment of the present invention, the inspection program 110 may, in the course of normal execution on the system under investigation 104, request storage of private data with a trusted third party 114 in case of future challenges. Such storage may be requested even for data that would normally be restricted from being accessed or returned by the program.

Figure 5:
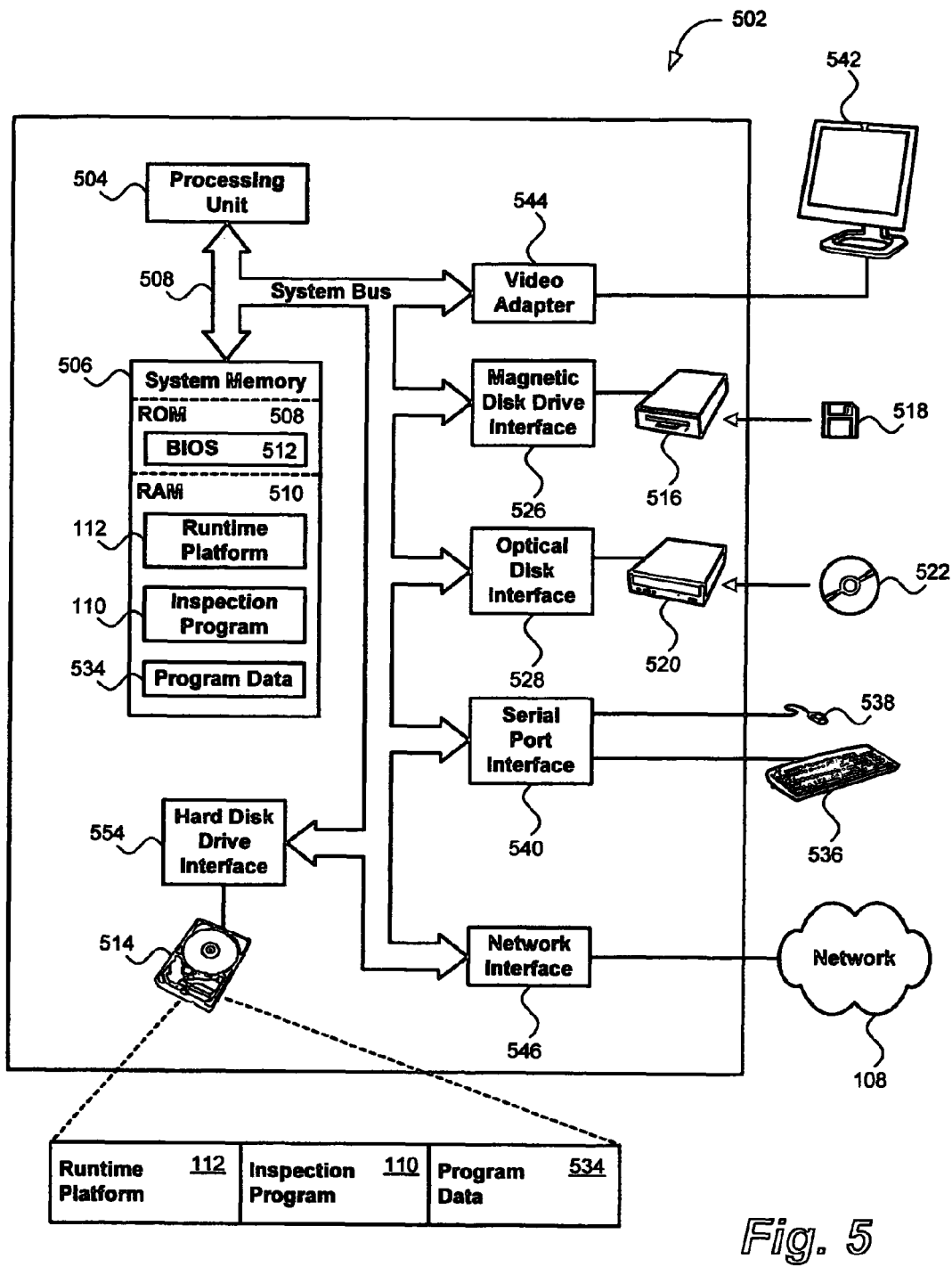
FIG. 5 shows an illustrative embodiment of a computer system embodying the present invention.

With reference to FIG. 5, an illustrative embodiment of a computer system 502 contemplated by the present invention is shown. The computer system 502 includes a processing unit 504, a system memory 506, and a system bus 508 that couples the system memory 506 to the processing unit 504. The system memory 506 includes read only memory (ROM) 508 and random access memory (RAM) 510. A basic input/output system (BIOS) 512, containing the basic routines that help to transfer information between elements within the computer system 502, such as during start-up, is stored in ROM 508.

The computer system 502 further includes a hard disk drive 514, a magnetic disk drive 516 (to read from and write to a removable magnetic disk 518), and an optical disk drive 520 (for reading a CD-ROM disk 522 or to read from and write to other optical media). The hard disk drive 514, magnetic disk drive 516, and optical disk drive 520 are connected to the system bus 508 by a hard disk interface 524, a magnetic disk interface 526, and an optical disk interface 528, respectively. The drives and their associated computer-readable media provide nonvolatile storage for the computer system 502. Although computer-readable media refers to a hard disk, removable magnetic media and removable optical media, it should be appreciated by those skilled in the art that other types of media that are readable by a computer, such as flash memory cards, may also be used in the illustrative computer system 502.

A number of program modules may be stored in the drives and RAM 510, including a runtime platform 112, an inspection program 110, program data 534, and other program modules (not shown). As discussed above, the inspection program is configured to inspect data accessible to it and report back its findings back to the inspecting system. The runtime platform 112 is independent from the inspection program 110 and may include an operating system for execution of compiled inspection programs, or an interpreter for execution of interpreted inspection programs.

A user may enter commands and information into the computer system 502 through a keyboard 536 and pointing device, such as a mouse 538. Other input devices (not shown) may include a microphone, modem, joystick, game pad, satellite dish, scanner, or the like. These and other input devices are often connected to the processing unit through a serial port interface 540 that is coupled to the system bus 508.

A monitor 542 or other type of display device is also connected to the system bus 508 via an interface, such as a video adapter 544. In addition to the monitor, the computer system 502 may include other peripheral output devices (not shown), such as speakers and printers.

The computer system 502 operates in a networked environment using logical connections to one or more remote devices. The remote device may be a server, a router, a peer device or other common network node. When used in a networking environment, the computer system 502 is typically connected to the network 108 through a network interface 546. In a network environment, program modules depicted relative to the computer system 502, or portions thereof, may be stored in one or more remote memory storage devices.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for inspection of a first computer system, the method comprising:
receiving a request to inspect the first computer system by a second computer system; and
sending the inspection program by a third computer system;
receiving a computer executable inspection program at the first computer system, the inspection program configured to inspect accessible data at the first computer system;
sending inspection data generated by the inspection program from the first computer system;
receiving evidence from the first computer system of an authenticity of the inspection data; and
providing a runtime platform at the first computer system for execution of the inspection program, the runtime platform being independent from the inspection program and configured to limit the contents of the inspection data to a maximum information content, and the runtime platform is further configured to limit the processing time of the inspection program
wherein the runtime platform is further configured to limit external communication of the inspection data to the third computer system.

2. The method of claim 1, further comprising selecting the inspection program based on a published specification from a first computer system.

3. The method of claim 1, further comprising receiving a bond from the second computer system against harm caused by execution of the inspection program.

4. An inspection system for inspecting a first computer system by a second computer system, the inspection system comprising:
a computer network; and
a third computer system coupled to the network, the third computer system configured to:
receive a request to inspect the first computer system by a second computer system;
receive at least one inspection program from the second computer system;
send the inspection program to the first computer system;
receive inspection data generated by the inspection program;
receive evidence from the first computer system of an authenticity of the inspection data; and
a runtime platform at the first computer system for execution of the inspection program, the runtime platform being independent from the inspection program and configured to limit external communication of the inspection data to the third computer system.

5. The inspection system of claim 4, wherein the third computer system is further configured to approve the inspection program.

6. The inspection computer system of claim 4, wherein the runtime platform is further configured to limit the contents of the inspection data to a maximum information content.

7. The inspection computer system of claim 3, wherein the third computer system is further configured to select the inspection program from a plurality of inspection programs.

8. The inspection computer system of claim 3, wherein the third computer system is further configured to negotiate selection of the inspection program such that the inspection program is acceptable to both the first computer system and the second computer system.

9. The inspection computer system of claim 3, wherein the third computer system is further configured to collect a bond from the second computer system against harm caused by execution of the inspection program.

10. A computer program product comprising a Non-transitory computer readable media embodying computer program code, the computer program code comprising computer executable instructions configured for:
receiving a request to inspect the first computer system by a second computer system; and
sending the inspection program by a third computer system;
receiving a computer executable inspection program at a system under inspection, the inspection program configured to inspect accessible data at the system under inspection;
sending inspection data generated by the inspection program from the system under inspection;
receiving evidence from the first computer system of an authenticity of the inspection data; and
executing the inspection program in a runtime platform at the system under inspection, the runtime platform being independent from the inspection program and configured to limit the contents of the inspection data to a maximum information content and to limit execution of the inspection program to a limited number of times in a given time interval.

11. The computer program product of claim 10, further comprising computer executable instructions configured for communicating a specification the inspecting program must conform to in order to execute at the system under inspection.

12. The computer program product of claim 10, further comprising computer executable instructions configured for sending evidence of execution of the inspection program at the system under inspection.

13. The computer program product of claim 10, further comprising computer executable instructions configured for sending the inspection data to the second computer system.

14. The computer program product of claim 10, further comprising computer executable instructions configured for sending the inspection data to a trusted third-party computer system.

* * * * *